(12) United States Patent
Jukkola et al.

(10) Patent No.: US 8,695,514 B2
(45) Date of Patent: Apr. 15, 2014

(54) GAS LEAKAGE REDUCTION SYSTEM

(75) Inventors: Glen D. Jukkola, Glastonbury, CT (US); Gregory N. Liljedahl, Tariffville, CT (US); Nsakala Ya Nsakala, South Windsor, CT (US); Mark Palkes, Glastonbury, CT (US)

(73) Assignee: Alstom Technology Ltd., Baden (CH)

( * ) Notice: Subject to any disclaimer, the term of this patent is extended or adjusted under 35 U.S.C. 154(b) by 745 days.

(21) Appl. No.: 12/465,822

(22) Filed: May 14, 2009

(65) Prior Publication Data
US 2010/0288172 A1    Nov. 18, 2010

(51) Int. Cl.
*F23B 70/00*    (2006.01)

(52) U.S. Cl.
USPC .............................. 110/204; 110/205; 110/206

(58) Field of Classification Search
USPC .............. 110/182.5, 205, 206, 207, 211, 216, 110/212, 345; 122/494, 506; 181/272
See application file for complete search history.

(56) References Cited

U.S. PATENT DOCUMENTS

| | | | | |
|---|---|---|---|---|
| 3,385,605 A * | 5/1968 | Hylbert et al. | ................. | 277/432 |
| 3,395,676 A * | 8/1968 | Sprague | ........................... | 122/32 |
| 3,592,171 A | 7/1971 | Bernstein | | |
| 3,818,873 A * | 6/1974 | Watanabe et al. | ............. | 122/494 |
| 4,093,242 A * | 6/1978 | Terry | ............................. | 277/580 |
| 5,048,636 A * | 9/1991 | Roehrs | .......................... | 181/272 |
| 6,360,680 B1 * | 3/2002 | Breen et al. | ................... | 110/345 |
| 6,832,485 B2 * | 12/2004 | Sugarmen et al. | .............. | 60/780 |
| 7,708,804 B2 * | 5/2010 | Darde et al. | ..................... | 95/129 |

FOREIGN PATENT DOCUMENTS

| | | |
|---|---|---|
| JP | 26409/93 | 2/1993 |
| JP | 7318016 | 12/1995 |

OTHER PUBLICATIONS

Notice of Preliminary Rejection from the Korean Patent Office, Application No. 10-2011-7029786, dated Nov. 25, 2013 (with English translation).

* cited by examiner

*Primary Examiner* — Khoa Huynh
*Assistant Examiner* — Timothy K Trieu
(74) *Attorney, Agent, or Firm* — Buchanan Ingersoll & Rooney PC

(57) ABSTRACT

An air infiltration abatement system (300) for a power plant (10) includes a recirculated flue gas source (175), a recirculated flue gas supply line (310) connected to the recirculated flue gas source (175) and a power plant component. The power plant component has a leakage area in fluid communication with the recirculated flue gas supply line (310). The recirculated flue gas source (175) receives a combustion flue gas (75) from an oxygen fired boiler (20) of the power plant (10), and provides the combustion flue gas (75) to the recirculated flue gas supply line (310). The recirculated flue gas supply line (310) supplies the combustion flue gas (75) as a recirculated flue gas (330) to the oxygen fired boiler (20) via the leakage area of the power plant component.

9 Claims, 3 Drawing Sheets

GAS LEAKAGE REDUCTION SYSTEM

TECHNICAL FIELD

The present disclosure relates generally to oxygen fired boilers, and more specifically, to an air infiltration abatement system therefor.

BACKGROUND

There is growing concern that emission of $CO_2$ and other greenhouse gases to the atmosphere is resulting in climate change and other as yet unknown consequences. Because existing fossil fuel fired power plants are among the largest sources of $CO_2$ emissions, capture of the $CO_2$ in flue gases from these plants has been identified as an important means for reducing atmospheric $CO_2$ emissions. To that end, oxygen firing is a promising boiler technology being developed to capture $CO_2$ from flue gases of both existing and new power plants.

In an oxygen fired power plant, a fossil fuel (such as coal, for example) is burned in a combustion process in a furnace of the power plant in a similar manner as in a conventional, e.g., air fired, power plant. In the oxygen fired power plant, however, oxygen and recirculated flue gas are used instead of air as an oxidizer in the combustion process. The recirculated flue gas contains primarily $CO_2$ gas; as a result, the furnace generates a $CO_2$ rich flue gas stream. The $CO_2$ rich flue gas is processed by a gas processing system, which captures the $CO_2$ from the flue gas prior to exhausting the flue gas to the atmosphere via a stack. In a typical oxygen-fired power plant, $CO_2$ levels in the flue gas leaving the furnace are reduced by more than 90% (percent-by-volume) before reaching the stack.

In addition to capturing $CO_2$ from the flue gas, the gas processing system of an oxygen-fired boiler purifies the $CO_2$ by partially removing impurities inherent to the flue gas, primarily water ($H_2O$), oxygen gas ($O_2$), and nitrogen gas ($N_2$). The $H_2O$ in the flue gas is unavoidable, since it comes from $H_2O$ in the coal itself, as well as combustion of hydrogen, which is also part of the coal. The $H_2O$ is relatively easy to remove, however, using a staged cooling/water vapor condensation process and/or a desiccant type dryer system.

Some of the $O_2$ and $N_2$ in the flue gas are unavoidable, as well. For example, some excess $O_2$ is normally required to ensure complete combustion of the coal, and therefore some of the residual $O_2$ will be present in the flue gas. In addition, some $N_2$ is typically contained in the coal itself Further, residual $N_2$ is often present with the $O_2$ supplied as the oxidizer, particularly in power plants which use a cryogenic type air separation unit to generate the $O_2$ to be used as the oxidizer.

Air leakage into the boiler also contributes to flue gas impurities such as $O_2$ and $N_2$. Air typically leaks into the boiler via openings such as around sootblowers and wallblowers where they penetrate the boiler, around boiler access doors, from air cooling systems for scanner and igniters, through coal pulverizers, and via boiler tube penetrations in penthouses and backpasses, for example. Air leakage into flue gas can be significant. For example, air leakage into a typical pulverized coal boiler may be as high as approximately 5% of the total combustion air, and older boilers may have even more air leakage.

As a result of the above-mentioned sources of impurities, $O_2$ and $N_2$ together, for example, typically make up of approximately 4 wt % (percent by weight) to 15 wt % of the flue gas in a typical oxygen fired boiler. These additional gases must be reduced by the gas processing system, and therefore result in larger, more costly equipment. In addition, the additional gases increase electrical power consumption for the $CO_2$ capture process, since more fan and/or compressor power is required to capture a given amount of $CO_2$.

The additional gases also affect the dew point of $CO_2$, e.g., a critical temperature of $CO_2$ for condensation and removal from the flue gas. More specifically, achievable $CO_2$ recovery is a function of both temperature and pressure. Partial pressures associated with the additional gases increase a total pressure of the flue gas, thereby making condensation of the CO2 more difficult, or even impossible, without raising operating temperature and/or pressure of the gas processing system. For example, at a gas processing system temperature of −60° F., a $CO_2$ recovery rate of 95% can be achieved from flue gas having approximately 4 wt % of additional gases at a pressure of approximately 300 psig. At the same temperature, however, the same $CO_2$ recovery rate can only be achieved for flue gas having 15 wt % additional gases by raising pressure to approximately 1000 psig. Thus, for the same recovery rate, more expensive, larger and/or more robust equipment, e.g., equipment capable of handling the higher pressure, must be utilized in the gas processing system. At the same time, more power is required to operate the $CO_2$ recovery system, such as to operate larger compressors capable of generating the higher pressure, for example.

Accordingly, it is desirable to develop an air infiltration abatement system which overcomes the problems described above.

SUMMARY

According to the aspects illustrated herein, there is provided an air infiltration abatement system for a power plant having an oxygen fired boiler. The air infiltration abatement system includes a recirculated flue gas source, a recirculated flue gas supply line connected to the recirculated flue gas source, and a power plant component. The power plant component has a leakage area in fluid communication with the recirculated flue gas supply line. The recirculated flue gas source receives a combustion flue gas from the oxygen fired boiler and provides the combustion flue gas to the recirculated flue gas supply line. The recirculated flue gas supply line supplies the combustion flue gas as a recirculated flue gas to the oxygen fired boiler via the leakage area of the power plant component.

According to the other aspects illustrated herein, an air infiltration abatement system includes a furnace, a recirculated flue gas source which receives a combustion flue gas from the furnace, a recirculated flue gas supply line connected to the recirculated flue gas source and which receives the combustion flue gas from the recirculated flue gas source, and a boiler penthouse connected to the recirculated flue gas supply line. The boiler penthouse receives the combustion flue gas from the recirculated flue gas supply line as a recirculated flue gas and supplies the recirculated flue gas to the furnace.

According to yet other aspects illustrated herein, an air infiltration abatement system includes a furnace; a recirculated flue gas source which receives a combustion flue gas from the furnace; a recirculated flue gas supply line connected to the recirculated flue gas source and which receives the combustion flue gas from the recirculated flue gas source; and a seal box connected to the recirculated flue gas supply line. The seal box receives the recirculated flue gas from the recirculated flue gas supply line as a recirculated flue gas and supplies the recirculated flue gas to the furnace.

According still other aspects illustrated herein, a method for reducing air infiltration in a power plant having an oxygen fired boiler includes receiving a combustion flue gas from the oxygen fired boiler, providing the combustion flue gas to a recirculated flue gas supply line as a recirculated flue gas, and supplying the recirculated flue gas to the oxygen fired boiler via a leakage area in fluid communication with a component of the power plant such that a pressure of the recirculated flue gas is greater that a pressure of the oxygen fired boiler.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
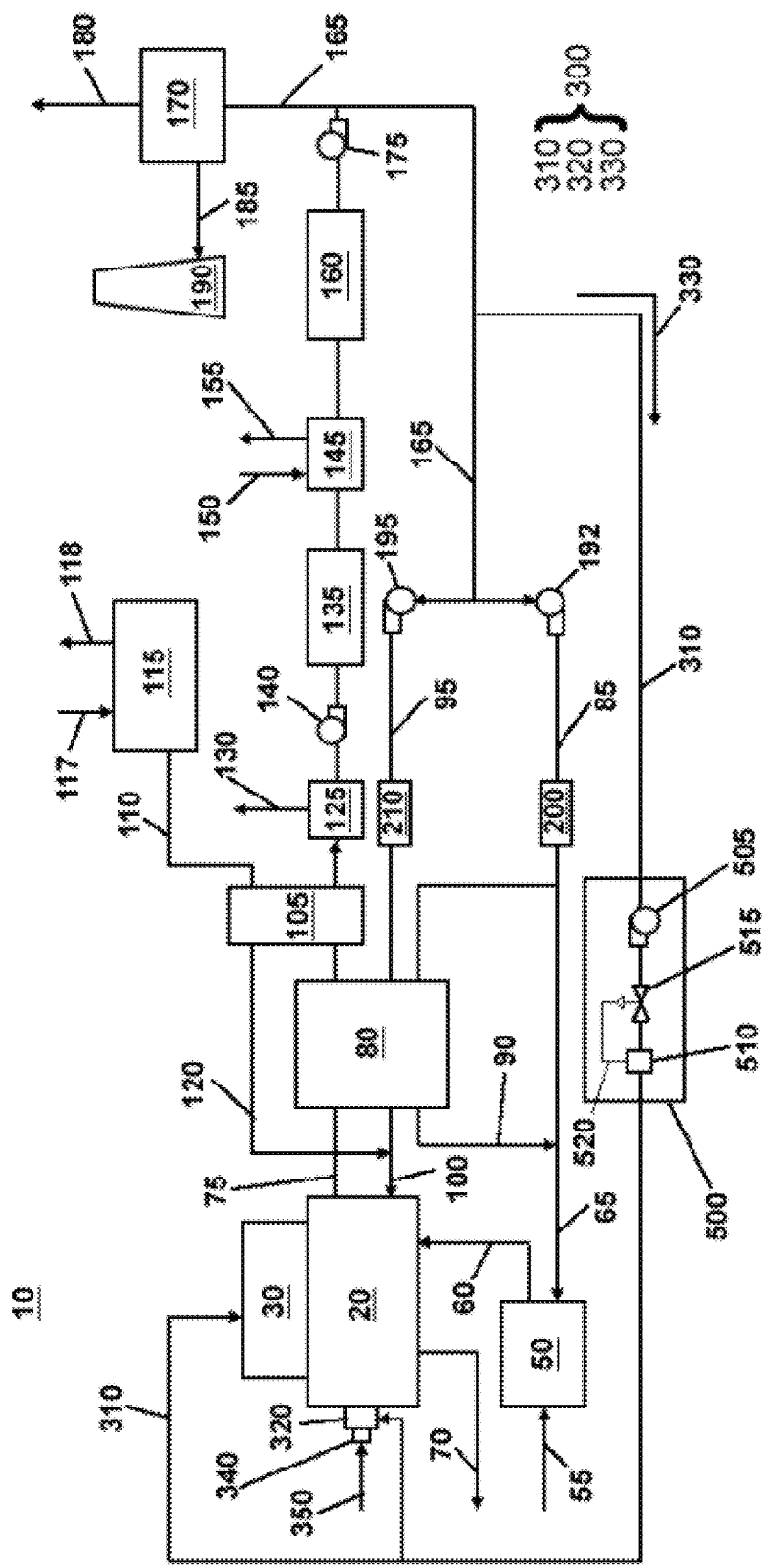
FIG. 1 is a block diagram of an exemplary embodiment of an air infiltration abatement system for an oxygen fired boiler in accordance with the present invention.

Disclosed herein is a system for a power plant, and more specifically, a gas leakage reduction system which substantially reduces and/or effectively minimizes air infiltration, e.g., air leakage, into a boiler of an oxygen fired power plant. Referring to FIG. 1, a power plant 10 includes a furnace 20. In an exemplary embodiment, the furnace 20 is an oxygen fired boiler, but is not limited thereto. For example, the furnace 20 may be a conventional boiler (not shown) or a CO2 capture ready boiler (not shown), but alternative exemplary embodiments are not limited thereto. For purposes of illustration only, discussion will hereinafter be directed to the power plant 10 having an oxygen fired boiler 20 shown in FIG. 1.

The power plant 10 according to an exemplary embodiment further includes a boiler penthouse 30 located above the oxygen fired boiler 20, as shown in FIG. 1. More specifically, the boiler penthouse 30 is located proximate to a boiler roof tube panel 35 to receive a heat exchanger tube 40 therethrough, as will be described in further detail below with reference to FIG. 2.

Still referring to FIG. 1, the power plant 10 further includes a pulverizer 50 which receives raw fuel 55, such as coal 55, for example, from an external source, pulverizes the coal 55 and supplies a mixture 60 of the pulverized coal 55 and mixed primary flue gas 65 to the oxygen fired boiler 20 for a combustion process therein. During the combustion process, bottom ash 70 leaves a lower portion of the oxygen fired boiler 20 to be discarded or otherwise disposed of, while combustion flue gas 75 leaves an upper portion of the oxygen fired boiler 20. After leaving the boiler 20, the combustion flue gas 75 passes through a heater 80, thereby heating both primary flue gas 85 to produce heated primary flue gas 90, as well as secondary flue gas 95 to produce heated secondary flue gas 100, as described in further detail below. In an exemplary embodiment, the heater 80 is a tri-sector air heater 80, but alternative exemplary embodiments are not limited thereto.

After passing through the air heater 80, the combustion flue gas 75 passes through an oxygen ($O_2$) heater 105 to heat $O_2$ 110 supplied from an air separation unit 115. The air separation unit 115 separates air 117 primarily into the $O_2$ 110 and nitrogen ($N_2$) 118. After the $O_2$ 110 is heated in the oxygen heater 105, heated $O_2$ 120 is supplied to the oxygen fired boiler 20 for the combustion process therein.

In an exemplary embodiment, the heated $O_2$ 120 is supplied to the oxygen fired boiler 20 with the heated secondary flue gas 100, as shown in FIG. 1, but alternative exemplary embodiments are not limited thereto. For example, the heated $O_2$ 120 may be supplied directly to the oxygen fired boiler 20, or alternatively, may be added to the secondary flue gas 95 upstream of, e.g., before entering, the air heater 80.

After passing through the $O_2$ heater 105, the combustion flue gas 75 passes through an electrostatic precipitator (ESP) 125 which separates fly ash 130 from the combustion flue gas 75 and supplies the combustion flue gas 75 to a feedwater heater 135 through an induced draft fan 140. In an exemplary embodiment, the feedwater heater 135 is a parallel pass type heat exchanger, but alternative exemplary embodiments are not limited thereto. The feedwater heater 135 heats feedwater (not shown) before supplying the feedwater to a steam generator portion (not shown) of the oxygen fired boiler 20.

The combustion flue gas 75 then passes through a flue gas desulfurization (FGD) system 145. The FGD system 145 is supplied with lime 150 from an external source (not shown) and removes pollutants 155, and more specifically sulfur-containing pollutants such as sulfur dioxide ($SO_2$), for example, from the combustion flue gas 75. Thereafter, the combustion flue gas 75 passes through a gas cooler 160, such as a direct contact gas cooler 160, for example which cools the combustion flue gas 75 to produce cooled flue gas 165 which is supplied to a gas processing system 170 via a booster fan 175. In an exemplary embodiment, the booster fan 175 serves as a recirculated flue gas source 175, as described in greater detail below. Further, the gas processing system 170 according to an exemplary embodiment is a carbon dioxide ($CO_2$) compression and liquefaction system 170, but alternative exemplary embodiments are not limited thereto. The $CO_2$ compression and liquefaction system 170 removes $CO_2$ 180 from the cooled flue gas 165. As a result, reduced $CO_2$ cooled flue gas 185 is thereby supplied to a stack 190 to be exhausted from the power plant 10.

Still referring to FIG. 1, a portion of the cooled flue gas 165 from the gas cooler 160 is supplied to a primary fan 192 and a secondary fan 195, which thereby produce the primary flue gas 85 and the secondary flue gas 95, respectively, which are supplied to other components of the power plant 20, as discussed above. More specifically, the primary fan 192 forces the primary flue gas 85 through a first steam coil air heater (SCAH) 200. After passing through the first SCAH 200, a portion of the primary flue gas 85 is directed through the air heater 80 before mixing with a remaining portion of the primary flue gas 85 to be supplied to the pulverizer 50 as the mixed primary flue gas 65. At the same time, the secondary fan 195 forces the secondary flue gas 95 through a second SCAH 210, and then through the air heater 80 and into the oxygen fired furnace 20 along with the heated $O_2$ 120.

In an exemplary embodiment, the power plant 10 includes an air infiltration abatement system 300 having a recirculated flue gas (RFG) supply line 310 and a seal box 320. The RFG supply line 310 receives recirculated flue gas 330 from the recirculated flue gas source 175 (e.g., the booster fan 175) and supplies the recirculated flue gas 330 to various components of the power plant 10, and, in particular, to components of the power plant 10 which allow gas, e.g., air, to infiltrate the oxygen fired boiler 20. More specifically, as shown in FIG. 1 and discussed in greater detail below with reference to FIGS. 2 and 3, the RFG supply line 310 supplies the RFG 330 to components of the power plant 10 such as a sootblower 340, which supplies sootblowing steam 350 to the oxygen fired boiler 20, and the boiler penthouse 30, for example, but is not limited thereto.

Figure 2:
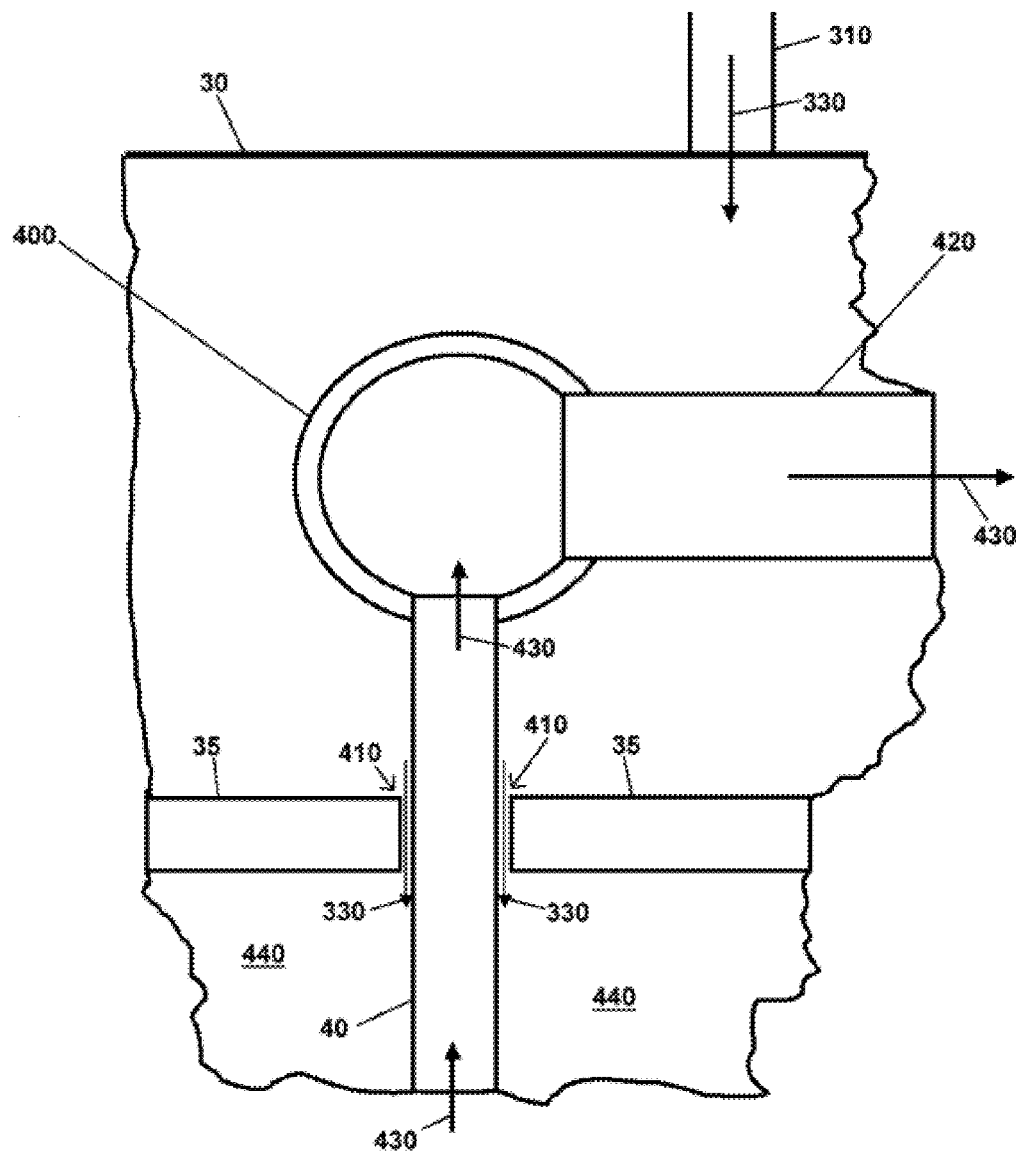
FIG. 2 is a partial cross-sectional view of a penthouse area of an oxygen fired boiler having an air infiltration abatement system according to an exemplary embodiment in accordance with the present invention.

Referring now to FIG. 2, the boiler penthouse 30 is an enclosed space located substantially above the boiler roof tube panel 35 wherein the heat exchanger tube 40 connects to a header 400. More specifically, the heat exchanger tube 40 passes through an aperture 410 disposed in the boiler roof tube panel 35 and into the boiler penthouse 30. Inside the boiler penthouse 30, the header 400 connects to a steam pipe 420. As a result, steam 430 from an interior space 440 of the oxygen fired boiler 20 (FIG. 1) passes through the heat exchanger tube 40, into the header 400, and on to the steam pipe 420. Thereafter, the steam 430 is delivered to another component of the power plant 10 such as the air heater 80 or a cyclone separator (not shown), for example.

The RFG supply line 310 supplies the RFG 330 to the boiler penthouse 30, as shown in FIG. 2. As a result, other gases, e.g., gases other than the RFG 330 such as air, $O_2$ and/or $N_2$, are effectively displaced from the boiler penthouse 30, thereby substantially reducing and/or effectively eliminating leakage of the other gases into the interior space 440 of the oxygen fired boiler 20 (FIG. 1). Put another way, the RFG 330 leaks into the interior space 440 instead of the other gases, as illustrated in FIG. 2.

Figure 3:
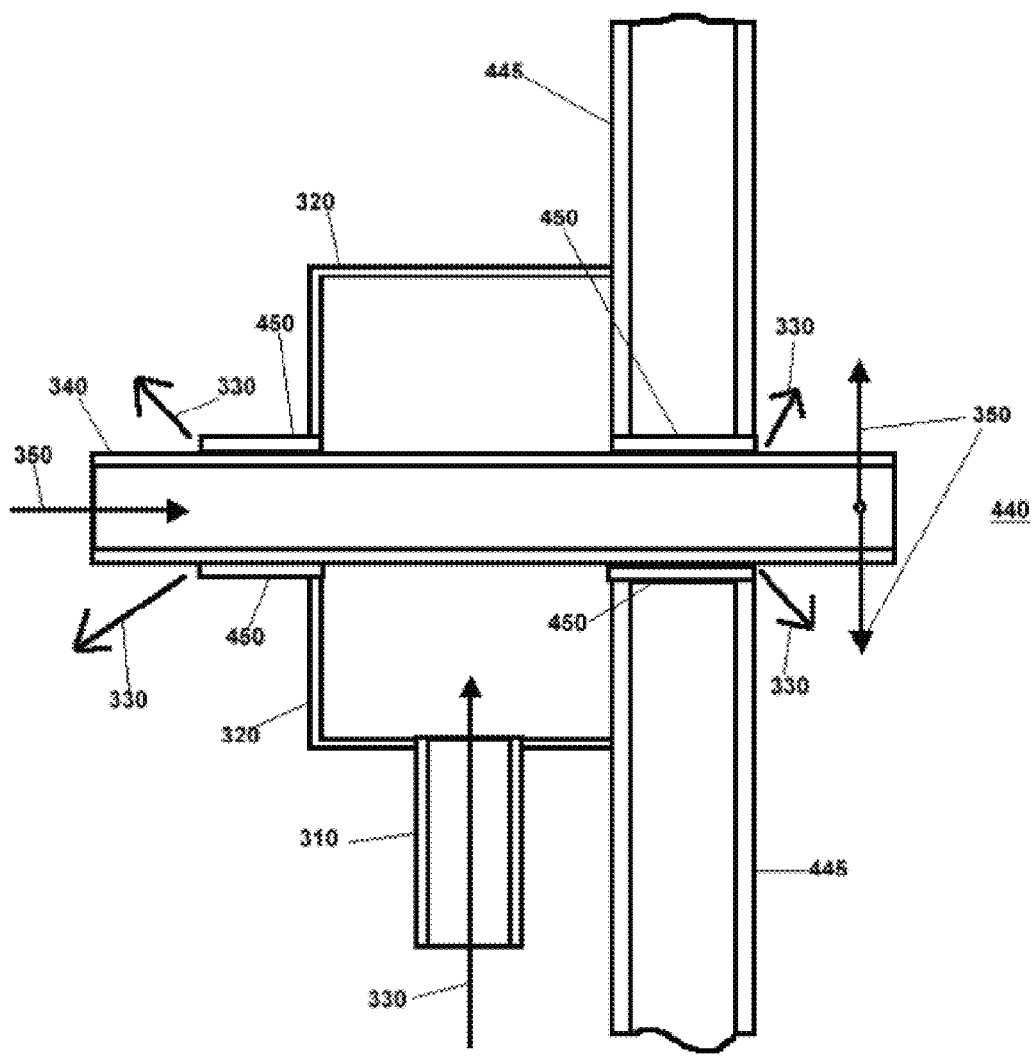
FIG. 3 is a partial cross-sectional view of a seal box of an air infiltration abatement system according to an exemplary embodiment in accordance with the present invention.

Referring now to FIGS. 1 through 3, the air infiltration system 300 according to an exemplary embodiment further includes the seal box 320 supplied with RFG 330 via the RFG supply line 310. As shown in FIG. 2, the seal box 320 substantially surrounds a connection area wherein the sootblower 340 penetrates a wall 445 of the oxygen fired boiler 20 to provide the sootblowing steam 350 to the interior space 440 thereof. More specifically, the sootblower 340 passes through sleeves 450 of the seal box 320. RFG 330 is supplied to the seal box 320 from the RFG supply line 310, and other gases (as described in greater detail above) in the connection area are thereby displaced by the RFG 330. As a result, leakage of the other gases into the interior space 440 is substantially reduced and/or effectively minimized. Specifically, and in a similar manner as described above with reference to FIG. 2, the RFG 330 leaks into the interior space 440 instead of the other gases, as shown in FIG. 2. Further, the pressure monitoring system (not shown) maintains a pressure in the seal box 320 to be greater than the pressure in the interior space 440 of the oxygen fired boiler 20, thereby enhancing reduced leakage of the other gases into the interior space 440.

An exemplary embodiment includes a pressure regulating part 500 located in the RFG supply line 310 (FIG. 1). Specifically, the pressure regulating part 500 includes a seal gas fan 505, a pressure sensor 510, and a pressure regulating valve 515 disposed therebetween. The pressure sensor 510 provides a signal 520 to the pressure regulating valve 515, and the pressure regulating valve 515 regulates a pressure of the RFG 330 based on the signal 520. As a result, the pressure regulating part 500 effectively controls the pressure of the RFG 330 at the pressure sensor 510 such that a downstream pressure, e.g., a pressure in the boiler penthouse 30 and/or the seal box 320, is greater than a pressure in the interior space 440 such that the RFG 330 flows into the interior space 440 instead the other gases. Further, the pressure regulating part 500 maintains a pressure differential between the downstream pressure and the pressure in the interior space 440 at a value which effectively prevents the other gases from flowing into the interior space 440, while also minimizing power requirements of the seal gas fan 505. More specifically, the pressure regulating part 500 according to an exemplary embodiment maintains the pressure differential at approximately 1% above the pressure in the interior space 440, or, put another way, at approximately 5 inches of water (gauge) when the pressure in the interior space 440 is approximately atmospheric pressure (e.g., approximately 14.7 pounds per square inch).

In an exemplary embodiment, the signal 520 may be provided to the pressure regulating valve 515 from a separate component (not shown), such as distributed control system (DCS), a controller or a processor, for example, to provide intelligent and/or variable control of the pressure differential. In an exemplary embodiment, for example, a value of the pressure in the interior space 440 is provided to the DCS, and the DCS outputs the signal 520 to maintain the pressure differential at a desired value, or, alternatively, in a desired range of values. The desired value or range may be fixed, programmable, or operator adjustable.

It will be noted that while exemplary embodiments herein have been described with reference to supplying the RFG 330 the boiler penthouse 30 and/or to the seal box 320, alternative exemplary embodiments are not limited thereto. Instead, the RFG 330 can be supplied to any power plant component or area where air or other gases infiltrate the oxygen fired boiler 20. For example, but not being limited thereto, the RFG 330 may be supplied to any combination of, or all of, the following power plant components: tube penetrations, boiler roof tube penetrations, tube bank penetrations, wall blowers, observation doors, access doors, igniters, scanners, fuel mills, fuel bins, fuel feeders, coal mills, coal bins, coal feeders, sorbent bins, windbox connections, expansion joints, duct expansion joints, duct connection expansion joints, shafts, fan shafts, damper shafts, ash hoppers, precipitators, baghouses, flue gas desulfurization absorber towers and air heaters.

Furthermore, the RFG 330 can be used in place of cooling air, such as cooling air which is used to cool igniters, for example; in this case the RFG 330 can be supplied with or without the use of the seal box 320.

In addition, alternative exemplary embodiments are not limited to use with the oxygen fired boiler 20 as described herein. Rather, the air infiltration abatement system 300 may be used with conventional, e.g., non-oxygen fired boilers, as well as $CO_2$ capture ready boilers, but alternate exemplary embodiments are not limited thereto.

Alternative exemplary embodiments may also include an isolation and purge system (not shown) including, e.g., fans, blowers and valves, arranged in order to isolate the air infiltration abatement system 300 from other components of the power plant 10 and to purge the RFG 330 therefrom, in order to perform maintenance, for example, on the power plant.

Thus, an air infiltration abatement system according to exemplary embodiments described herein provides at least the advantage of substantially reduced and/or effectively minimized air infiltration, e.g., air leakage, into an oxygen fired boiler. As a result, required size and/or electrical power consumption by components of a gas processing system of the oxygen fired boiler is substantially reduced, thereby resulting in a reduction in cost of the components of the gas processing system and operation thereof While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. An air infiltration abatement system for a power plant having an oxygen fired boiler, the air infiltration abatement system comprising: a recirculated flue gas source;
a recirculated flue gas supply line connected to the recirculated flue gas source; and a power plant component, the power plant component having a leakage area in fluid communication with the recirculated flue gas supply line, wherein the recirculated flue gas source receives a combustion flue gas from the oxygen fired boiler and provides the combustion flue gas to the recirculated flue gas supply line, and the recirculated flue gas supply line supplies the combustion flue gas as a recirculated flue gas to the oxygen fired boiler via the leakage area of the power plant component; and a seal box comprises a sleeve in communication with the leakage area of the power plant component, and the recirculated flue gas is further supplied the oxygen fired boiler, via the leakage area of the power plant component, through the sleeve of the seal box;
wherein the seal box surrounds a connection area and wherein a sootblower penetrates the sleeve and a wall of the oxygen fired boiler to provide the sootblowing steam to the interior space; the recirculated flue gas displaces an additional gas in the leakage area of the power plant component such that the additional gas is prevented from leaking into the oxygen fired boiler;
a pressure regulating part includes a seal gas fan, a pressure sensor and a pressure regulating valve disposed therebetween; the pressure regulating sensor provides signal to the pressures regulating valve, and the pressure regulating valve regulates a pressures of the regulating flue gas based on the signal; the pressure regulating part selectively controls the pressure of the regulating flue gas at the pressure sensor such that a downstream pressure; the pressure regulating part maintains a pressure differential between the downstream pressure and the pressure interior space at a value which effectively prevents the additional gas from flowing into the interior space and wherein the leakage of the additional gas into the interior space is substantially reduced and/or effectively minimized.

2. The air infiltration abatement system of claim 1, wherein a pressure in the power plant component is greater than a pressure in the oxygen fired boiler.

3. The air infiltration abatement system of claim 1, wherein the oxygen fired boiler comprises:
a roof tube panel having an aperture; and a heat exchanger tube, and the power plant component comprises a boiler penthouse disposed above the roof tube panel and receives the heat exchanger tube through the aperture.

4. The air infiltration abatement system of claim 1, wherein the power plant component comprises one of a tube penetration, a boiler roof tube penetration, a tube bank penetration, a sootblower, a wall blower, an observation door, an access door, an igniter, a scanner, a fuel mill, a fuel bin, a fuel feeder, a coal mill, a coal bin, a coal feeder, a sorbent bin, a windbox connection, an expansion joint, a duct expansion joint, a duct connection expansion joint, a shaft, a fan shaft, a damper shaft, an ash hopper, a precipitator, a baghouse, a flue gas desulfurization absorber tower and an air heater.

5. the air infiltration abatement system of claim 1, wherein the additional gas comprises at least one of are, oxygen and nitrogen.

6. An air infiltration abatement system comprising:
a furnace; a recirculated flue gas source which receives a combustion flue gas from the furnace;
a recirculated flue gas supply line connected to the recirculated flue gas source and which receives the combustion flue gas from the recirculated flue gas source; and a seal box connected to the recirculated flue gas supply line, wherein the seal box receives the combustion flue gas from the recirculated flue gas supply line as a recirculated flue gas and supplies the recirculated flue gas to the furnace via a leakage area between a power plant component and the furnace and the recirculated flue gas displaces an additional gas in the leakage area of the power plant component such that the additional gas is prevented from leaking into the oxygen fired boiler; wherein the furnace comprises one of an oxygen fired boiler and a CO2 capture ready boiler; wherein the seal box comprises a sleeve in fluid communication with the leakage area of the power plant component, and the seal box further supplies the recirculated flue gas to the furnace through the sleeve; a pressure regulating part includes a seal gas fan, a pressure sensor and a pressure regulating valve disposed therebetween; the pressure regulating sensor provides signal to the pressures regulating valve, and the pressure regulating valve regulates a pressures of the regulating flue gas based on the signal; the pressure regulating part selectively controls the pressure of the regulating flue gas at the pressure sensor such that a downstream pressure; the pressure regulating part maintains a pressure differential between the downstream pressure and the pressure interior space at a value which effectively prevents the additional gas from flowing into the interior space and wherein the leakage of the additional gas into the interior space is substantially reduced and/or effectively minimized.

7. The air infiltration abatement system of claim 6, wherein the leakage area of the power plant component is in fluid communication with the recirculated flue gas supply line.

8. The air infiltration abatement system of claim 7, wherein the power plant component comprises one of a tube penetration, a boiler roof tube penetration, a tube bank penetration, a sootblower, a wall blower, an observation door, an access door, an igniter, a scanner, a fuel mill, a fuel bin, a fuel feeder, a coal mill, a coal bin, a coal feeder, a sorbent bin, a windbox connection, and expansion joint, a duct expansion joint, a duct connection expansion joint, a shaft, a fan shaft, a damper shaft, an ash hopper, a precipitator, a baghouse, a flue gas desulfurization absorber tower and an air heater.

9. The air infiltration abatement system of claim 6, wherein a pressure in the seal box is greater than a pressure in the furnace.

* * * * *

UNITED STATES PATENT AND TRADEMARK OFFICE
CERTIFICATE OF CORRECTION

PATENT NO. : 8,695,514 B2  Page 1 of 1
APPLICATION NO. : 12/465822
DATED : April 15, 2014
INVENTOR(S) : Glen D. Jukkola et al.

It is certified that error appears in the above-identified patent and that said Letters Patent is hereby corrected as shown below:

In the Claims:

Claim 1, Column 7, line 38 delete "such that a downstream pressure" insert -- and --

Claim 6, Column 8, lines 36-37 delete "such that a downstream pressure" insert -- and --

Signed and Sealed this
Twenty-first Day of October, 2014

Michelle K. Lee
*Deputy Director of the United States Patent and Trademark Office*